US010739317B2

(12) United States Patent
Morel et al.

(10) Patent No.: US 10,739,317 B2
(45) Date of Patent: Aug. 11, 2020

(54) METHOD FOR MONITORING AND DETECTING THE FORMATION OF DEGRADATION IN AT LEAST ONE MOVING PART OF A ROTATING MECHANISM AND ASSOCIATED SYSTEM

(71) Applicant: AIRBUS HELICOPTERS, Marignane (FR)

(72) Inventors: Herve Morel, Lamanon (FR); Jonathan Rodriguez, Villeneuve-sous-Charigny (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 16/226,802

(22) Filed: Dec. 20, 2018

(65) Prior Publication Data

US 2019/0265204 A1    Aug. 29, 2019

(30) Foreign Application Priority Data

Feb. 26, 2018   (FR) ..................................... 18 70202

(51) Int. Cl.
*G01N 29/44*      (2006.01)
*B64F 5/60*       (2017.01)
(Continued)

(52) U.S. Cl.
CPC .............. *G01N 29/44* (2013.01); *B64F 5/60* (2017.01); *G01M 5/0016* (2013.01);
(Continued)

(58) Field of Classification Search
CPC .............. G05B 13/028; G05B 19/4183; G05B 19/4184; G05B 19/41845; G05B 19/4185;
(Continued)

(56) References Cited

U.S. PATENT DOCUMENTS 7,325,461 B2   2/2008   Bitto et al.
7,363,172 B2   4/2008   Nichols et al.
(Continued)

FOREIGN PATENT DOCUMENTS

EP          3106846 A1    12/2016
WO       2004059399 A2     7/2004
(Continued)

OTHER PUBLICATIONS

French Search Report for Application No. 1870202, Completed by the French Patent Office, dated Oct. 17, 2018, 8 pages.

*Primary Examiner* — Daniel Previl
(74) *Attorney, Agent, or Firm* — Brooks Kushman P.C.

(57) ABSTRACT

A method for monitoring and detecting the formation of damage in at least one moving part of a rotary mechanism forming all or part of a kinematic transmission chain of an engine torque, the rotary mechanism equipping an aircraft, the method being implemented by a monitoring and detection system including at least one vibration sensor for measuring accelerations in at least one direction and generating a vibration signal as a function of time, the at least one vibration sensor being secured to a fixed casing of the aircraft and arranged near the rotary mechanism, at least one measuring member for measuring an angular position of the at least one moving part, each moving part including at least one degree of rotational freedom around a rotation axis.

20 Claims, 4 Drawing Sheets

(51) Int. Cl.
*G01N 29/06* (2006.01)
*G01M 5/00* (2006.01)
*G01M 7/00* (2006.01)

(52) U.S. Cl.
CPC ........ *G01M 5/0033* (2013.01); *G01M 5/0066* (2013.01); *G01M 7/00* (2013.01); *G01N 29/069* (2013.01); *G01N 2291/0289* (2013.01)

(58) Field of Classification Search
CPC ........ G05B 19/41865; G05B 19/41875; G05B 2219/32287; G05B 2219/35001; G05B 2219/37337; G05B 2219/37351; G05B 2219/37434; G05B 2219/40115; G05B 2219/45004; G05B 2219/45129; G05B 23/0221; G05B 23/0229; G05B 23/024; G05B 23/0264; G05B 23/0283; G05B 23/0286; G05B 23/0289; G05B 23/0291; G05B 23/0294; G05B 23/0297; G05B 19/0425; G05B 2219/25428; G05B 2219/33331; G06K 9/6263; G06K 9/62; G06K 9/6262; G06N 20/00; G06N 3/02; G06N 5/046; G06N 7/005; G06N 3/006; G06N 3/0445; G06N 3/0454; G06N 3/0472; G06N 3/084; G06N 3/088; G06N 3/126; G06N 20/10; G06N 20/20; G06N 3/0427; G06N 3/0436; G06N 3/049; G06N 3/086; G06N 5/003; H04B 17/309; H04B 17/318; H04L 1/0002; H04L 1/0041; H04L 5/0064; H04L 67/1097; H04L 67/12; H04L 1/18; H04L 67/04; H04L 67/10; Y02P 80/114; Y02P 90/02; B64F 5/60; G01M 5/0016; G01M 5/0033; G01M 5/0066; G01M 7/00; G01N 2291/0289; G01N 29/069; G01N 29/44
USPC ............ 340/683, 681, 669, 672, 685, 686.6, 340/691.1, 825.23, 5.32, 5.2, 7.32, 825.49
See application file for complete search history.

(56) References Cited

U.S. PATENT DOCUMENTS

| | | |
|---|---|---|
| 2011/0046929 A1 | 2/2011 | Bryant |
| 2013/0075531 A1* | 3/2013 | Jiao .......................... H05B 3/86 244/134 D |
| 2014/0138474 A1* | 5/2014 | Sharpin .................... F41G 7/00 244/3.22 |
| 2016/0216363 A1* | 7/2016 | Martin ....................... G01S 5/20 |
| 2017/0300047 A1* | 10/2017 | Kolanek ................. F41G 7/308 |

FOREIGN PATENT DOCUMENTS

| | | |
|---|---|---|
| WO | 2004059399 A3 | 7/2004 |
| WO | 2004065927 A1 | 8/2004 |
| WO | 2015086959 A1 | 6/2015 |

* cited by examiner

METHOD FOR MONITORING AND DETECTING THE FORMATION OF DEGRADATION IN AT LEAST ONE MOVING PART OF A ROTATING MECHANISM AND ASSOCIATED SYSTEM

CROSS-REFERENCE TO RELATED APPLICATIONS

This application claims priority to French patent application No. FR 1870202 filed on Feb. 26, 2018, the disclosure of which is incorporated in its entirety by reference herein.

BACKGROUND OF THE INVENTION

(1) Field of the Invention

The present invention relates to the technical field of methods for monitoring wear, the formation of a hairline crack or fissure and/or a structural break in at least one moving part of a rotary mechanism. The rotary mechanism is also arranged in an aircraft, for example a rotorcraft, equipped with at least one engine, at least one primary rotor contributing to lift, or even also to the propulsion of the aircraft, and at least one primary power transmission gearbox.

(2) Description of Related Art

Furthermore, such a rotary mechanism then forms all or part of a kinematic transmission chain for an engine torque and may be arranged in the primary power transmission gearbox. The rotary mechanism may in particular be formed by a planetary reduction gearing to rotate the primary rotor(s) of a rotorcraft, for example.

The moving part(s) intended to be monitored by the monitoring method and device may then be at least one of the parts chosen from among a sun gear, secured to an input shaft of the rotary mechanism, one (or several) planet carriers, secured to an output shaft of the rotary mechanism, and all or some of the planet gears provided with bearings such as, in particular, rolling bearings including rolling elements such as balls or rollers with a cylindrical, conical or toroidal profile.

Each planet gear thus includes a pinion rotatable around a rotation axis, such a pinion being equipped with teeth and being able to mesh on the one hand with a toothed pinion secured to the sun gear and on the other hand with a guide ring.

In this case, such a monitoring and detection method may then make it possible to detect a break of one of the teeth of the planet gear(s), an input pinion of the sun gear(s) and/or the guide ring, a hairline crack of a planet gear in a sub-layer as well as pronounced wear at an inner or outer ring of a bearing equipping a planet gear, a rolling element or a cage of said bearing.

In general, and as described in documents WO 2015/086959, WO 2004/059399, EP 3,106,846, WO 2004/065927, U.S. Pat. Nos. 7,325,461, 7,363,172 and US 2011/0046929; it is known to monitor and identify damage in a mechanism by measuring and analyzing a vibrational operating signal of the mechanism.

However, false alarms can be generated, then involving an unneeded stop, or even disassembly, for the rotary mechanism.

Furthermore, such methods are generally not suitable for monitoring rotary mechanisms for example including a planetary reduction gearing with several planet gears.

BRIEF SUMMARY OF THE INVENTION

The present invention then aims to propose a method and device making it possible to do away with the aforementioned limitations. Furthermore, the method according to the invention can also make it possible to identify, in a faulty planetary reduction gearing, which planet gear has pronounced wear or any structural anomaly, such as a broken tooth, scaling of a rolling track or a hairline crack in formation.

The invention therefore relates to a method for monitoring and detecting the formation of damage in at least one moving part of a rotary mechanism forming all or part of a kinematic transmission chain of a motor torque, the rotary mechanism equipping an aircraft and the method including:

at least a first measuring step including measuring vibrations in at least one direction and generating a vibrational signal for operation of the rotary mechanism as a function of time, the first measuring step being carried out using at least one vibrational sensor secured to a fixed casing of the aircraft and optionally arranged near the rotary mechanism, namely in a zone allowing the vibrational sensor to measure the vibrations, at least one second measuring step including a measurement of the angular position of the moving part(s), the moving part(s) including at least one degree of rotational freedom around a rotation axis.

According to the invention, such a method is remarkable in that it includes at least:

a preprocessing step for calculating a synchronous variance of the vibrations of the vibrational signal measured by the vibrational sensor(s) over a cycle of a predetermined number n of rotations of the moving part(s) respectively around the rotation axis or axes, the synchronous variance being determined from an average of the deviations squared between a vibration value measured at a predetermined moment and an average value of the vibrational signal calculated at the same predetermined moment, a mapping step for generating at least two maps $M_1$, $M_2$ representative respectively of a value of the synchronous variance as a function on the one hand of the angular position of the moving part(s) and on the other hand of a range of predetermined harmonics of the vibrational signal, the at least two maps $M_1$, $M_2$ respectively corresponding to successive acquisitions of the synchronous variance of at least two moments $t_1$, $t_2$ separate from one another;

an analysis step for comparing the values of the synchronous variance between at least two successive maps $M_1$, $M_2$, the analysis step making it possible to generate an indicator CI as a function of a comparison between a first map $M_1$ of the synchronous variance at a first moment $t_1$ and a second map $M_2$ of the synchronous variance at a second moment $t_2$ later than the first moment $t_1$, and an alarm step for generating an alarm when a current value $CI_{t1}$, $CI_{t2}$ of the indicator CI exceeds a predetermined threshold value corresponding to the damage in the moving part(s) of the rotary mechanism.

In other words, such a method in particular makes it possible to monitor and detect an anisotropy in the moving part(s) from an acquisition of the accelerations produced and transmitted to the fixed casing of the aircraft during the operation of the rotary mechanism. This fixed casing can be secured to or serve as support for a fixed part of the rotary mechanism, in particular such as a fixed outer ring provided with teeth of a planetary reduction gearing.

Furthermore, the analysis of the vibrational signal can make it possible to identify variations of a meshing thickness of the moving part(s) upon each of its rotations. The measurement of the accelerations is therefore synchronized either with the measurement of the angular position of each moving part respectively around its rotation axis or with the angular position of only one of the moving parts making up the rotary mechanism.

For example, a vibrational signature of the damage on a moving part, such as a planet gear of a planetary reduction gearing, can thus be identified by a local variation in the meshing thickness between the teeth of said planet gear with those of a fixed ring and/or an input pinion of the sun gear.

Furthermore, the preprocessing step for calculating a synchronous variance of the accelerations may include a sub-step consisting of synchronously resampling the vibrational signal with the measurement of the angular position of a planet carrier of the planetary reduction gearing. This resampling sub-step thus makes it possible to make the various acquisitions of the accelerations of the monitored moving part(s) synchronous with one another.

The preprocessing step may also include a calculating sub-step making it possible to calculate a synchronous average over a cycle of rotations of the monitored moving part(s) such as a planet carrier. Traditionally, this calculating average value is determined for one revolution of the moving part(s) from a sum of the vibrations measured over the predetermined number n of rotations. Such a number n can be chosen as an integer greater than or equal to 2.

In this way, the preprocessing step makes it possible to eliminate the influence of the measuring noise and the nonsynchronous harmonics of the moving part(s). A cycle is then defined by a predetermined number n of rotations of the planet carrier necessary for a tooth of a planet gear to be positioned again across from a same tooth belonging to a guide ring. In this case, the predetermined number n then corresponds to the number of possible angular positions of a planet gear.

The preprocessing step may include a calculating sub-step for calculating a sliding fast Fourier transform from the acquired vibrational signal. Such a Fourier transform thus has a constant length and corresponds to a passage "observation" angle $\alpha$ for the monitored moving part(s). This calculating sub-step then makes it possible to provide a plurality of acceleration maps, an x-axis corresponding to the angular value according to one revolution of the monitored moving part(s) such as the planet carrier, a y-axis corresponding to a predetermined range between two harmonics of the Fourier transform and the measurements of the accelerations being calculated by the sliding Fourier transform.

Subsequently, the mapping step in turn makes it possible to determine the synchronous variance, or the point-to-point variance of the plurality of acceleration maps calculated for each of the n possible positions of the monitored moving part(s). Such a preprocessing step then makes it possible to reduce, or even eliminate, the impact of the synchronous harmonics of the rotary mechanism, leaving only the anomalies observable over a part of the n revolutions of a planet carrier of a planetary reduction gearing visible, for example like a modification in local stiffness of the teeth of a planetary reduction gearing planet gear.

Advantageously, the preprocessing step may be done on board the aircraft, the method including a data transmission step allowing a transmission of the data representative of the synchronous variance to at least one ground station, the mapping, analysis and alarm steps in turn being done on the ground in whole or in part with the ground station.

The preprocessing step then makes it possible to reduce the size of the data collected during flight before they are stored in a memory on board the aircraft.

Furthermore, each cycle may be done during a predetermined flight phase, i.e., it must allow a minimal number of measurements of the accelerations per hour of flight in order to guarantee a detection performance of the presence of damage in the moving part(s). Such a method may also require stability of the flight parameters of the aircraft and for example be done at a constant rotation speed of the primary rotor and/or a constant drive motor torque of the primary rotor.

Once the aircraft is on the ground, the data contained in said memory are sent to the ground station, which may process them, then analyze them to generate, if applicable, an alarm allowing a maintenance team to perform at least one inspection of the damage to the monitored moving part(s).

Furthermore, such a ground station may be formed for example by one or several computer(s) connected to one another and include one or several server(s) with a connection to an Internet network allowing communication between the various computer(s) and/or server(s) forming said ground station.

In practice, the mapping step includes, for each of the maps $M_1$, $M_2$, a sub-step for normalization of the values of the synchronous variance, the normalization sub-step making it possible to assign a value equal to 0 to pixels representative of a minimum of the synchronous variance and a value equal to 1 to pixels representative of a maximum of the synchronous variance, the normalization sub-step also making it possible to assign a value of between 0 and 1 to all of the other pixels representative of a value between the minimum and the maximum of the synchronous variance.

Such a normalization sub-step thus makes it possible to make the mapping step independent of any maintenance actions, and in particular for example assembly or disassembly operations for the vibration sensor(s) or assembly or disassembly of a rotor mast in the case of a rotorcraft.

In one advantageous example embodiment of the invention, the mapping step may include, for each of the maps $M_1$, $M_2$, a discretization sub-step making it possible to assign a value equal to 0 to each pixel initially representative of a value of the synchronous variance below a predetermined threshold value h and to assign a value equal 1 to each pixel initially representative of a value of the synchronous variance greater than or equal to a predetermined threshold value h.

Furthermore, such a predetermined threshold value h may be determined by tests and/or simulations and may for example advantageously be chosen equal to 0.5. This predetermined threshold value h may also be variable as a function of criteria such as total energy contained in a considered map, for example. This discretization step then makes it possible to generate maps allowing an analysis restricted solely to the values of the synchronous value above the predetermined threshold value h.

Advantageously, the mapping step may include a classification sub-step for classifying, in at least two classes C1, C2, at least two forms made up of juxtaposed pixels belonging to the plurality of maps M1, M2, the pixels each respectively being assigned a value equal to 1, the classification sub-step making it possible to identify at least two groups of pixels and classify the groups according to a decreasing order depending on a number of juxtaposed pixels assigned a value equal to 1 respectively making them up, a first class C1 corresponding to a first group G1 and a second class C2 corresponding to a second group G2 having a number of juxtaposed pixels assigned a value equal to 1 less than the number of juxtaposed pixels assigned a value equal to 1 of the first group G1.

In other words, such classification sub-step imaging makes it possible to quantify a set of surfaces using a connected components analysis method. Such an image processing analysis method thus makes it possible to identify groups of pixels G1, G2 connected to one another forming these connected components using an identification of surfaces satisfying a "4-connectedness" criterion according to the mathematical field of algebraic topology and more specifically in homotopy theory.

The classification sub-step then makes it possible to assign each of the groups of pixels G1, G2 a class by decreasing order of energy C1, C2. The calculation of the energy by surface area of each of the groups of pixels G1, G2 can be determined, for example, by the number of pixels making them up or by an energy calculated by projection for each of the maps $M_1$, $M_2$.

For example, such a classification sub-step makes it possible to assign each map $M_1$, $M_2$ eight classes C1 to C8 each represented by a color level. Each class C1 to C8 then corresponds to an isolated group of pixels G1 to G8, the attribute of which is assigned by decreasing order: C1 corresponding to the group of pixels G1 having the highest energy and C8 corresponding to the group of pixels G8 having the lowest energy.

In practice, for each of the maps $M_1$, $M_2$, the classification sub-step may contain, in a same group, pixels assigned a value equal to 1 forming a first subgroup of pixels including at least one pixel assigned a value equal to 1 touching, on the x-axis, the origin of the map $M_1$, $M_2$ and corresponding to an angular position of the moving part(s) greater than 0 radian and pixels assigned a value equal to 1 forming a second subgroup of pixels including at least one pixel assigned a value equal to 1 touching, on the x-axis, a value of $2\pi$ radians of the map $M_1$, $M_2$ and corresponding to an angular position of the moving part(s) of less than $2\pi$ radians, the pixel(s) of the first subgroup having, on the x-axis corresponding to the angular position of the moving part(s) equal to 0 radians, a harmonic value equal to that of the pixel(s) of the second subgroup in the angular position of the moving part(s) equal to $2\pi$ radians.

In other words, in the case of a rotary mechanism formed by a planetary reduction gearing, the x-axis of each of the maps $M_1$, $M_2$ corresponds to the number of teeth of the guide ring, yet the latter being cylindrical, each map may also be considered an unwound cylinder. The column with x-axis 0 radian is then next to the column with x-axis $2\pi$ radians. As a result, the groups of pixels G1, G2 on the boundaries and close to iso-y-axis can be assigned an identical class.

According to one advantageous example embodiment of the invention, the analysis step may include a first calculating sub-step consisting of calculating, superimposing the first map $M_1$ with the second map $M_2$, respectively for each class C1, C2, an intersection surface S3 between a first form F1 corresponding to the class C1, C2 of the first map $M_1$ and a second form F2 corresponding to the class C1, C2 of the second map $M_2$.

In other words, such an intersection surface S3 is calculated, for each of the different classes C1, C2, by comparing the relative size and position between a first form F1 corresponding to a first group of pixels G1 on the first map $M_1$ with a second form F2 of the same first group of pixels G1 on the second map $M_2$.

Advantageously, the analysis step may include a second calculating sub-step consisting of calculating, in the superposition of the first map $M_1$ with the second map $M_2$, respectively for each class C1, C2, an exclusion surface S4 between a first form F1 corresponding to the class C1, C2 of the first map $M_1$ and a second form F2 corresponding to the class C1, C2 of the second map $M_2$, the exclusion surface S4 being equal to the sum between a first surface S1 of the first form F1 and a second surface S2 of the second form F2 from which the intersection surface S3 is deducted.

Of course, like before, such an exclusion surface S4 can also be determined, for each of the different classes C1, C2, by comparing the relative size and position between a first form F1 corresponding to a first group of pixels G1 on the first map $M_1$ with a second form F2 from the same first group of pixels G1 on the second map $M_2$.

In practice, the analysis step may include a third calculating sub-step consisting of calculating a score P equal to the difference between the intersection surface S3 and the exclusion surface S4.

Hereinafter, when the score P is negative, one deduces from this that the forms F1, F2 of a same group of pixels G1 or G2 are stationary little or not at all in the different maps $M_1$, $M_2$. Such a phenomenon may then be caused in particular by the presence of noises only in one of the maps $M_1$, $M_2$, which reveals an anisotropic nature of the moving part(s). Alternatively, such a negative score P may also be a sign that the moving part(s) is (are) not damaged.

Conversely, when the score P is positive, it is then deduced that the forms F1, F2 of a same group of pixels G1 or G2 are stationary in the different maps $M_1$, $M_2$. In this way, it is possible to identify a local emergence of the harmonic variance in the noise of the different maps $M_1$, $M_2$. Such a phenomenon is then the sign of an anisotropic nature of the moving part(s). Alternatively, such a positive score P can be due to damage to one (or several) moving part(s).

According to one advantageous embodiment of the invention, the analysis step may include a fourth calculating sub-step consisting of respectively calculating, for each class C1, C2, current values $CI_{t1}$, $CI_{t2}$ of the indicator CI per iteration, a second current value $CI_{t2}$ of the indicator CI corresponding to the second map $M_2$ being equal to a maximum between the value 0 and the sum between, on the one hand, a first current value $CI_{t1}$ of the indicator CI corresponding to the first map $M_1$ and on the other hand, a product between the score P and the time elapsed dt between the moments $t_2$ and $t_1$, according to the equation:

$$CI_{t2}=\max([0,CI_{t1}+P\cdot dt])$$

with $dt=t_2-t_1$.

In other words, an increase in the indicator CI indicates the presence of a stationary form F1, F2 in the maps $M_1$, $M_2$ that is then interpreted as the local emergence of a harmonic variance and therefore an anisotropy of one (or several) moving part(s). Otherwise, the stagnation of the indicator CI near 0 indicates the presence of noises in the maps $M_1$, $M_2$, therefore over one (or several) healthy moving part(s).

The present invention also relates to a system for monitoring and detecting the formation of damage in at least one moving part of a rotary mechanism forming all or part of a kinematic transmission chain for an engine torque, the rotary mechanism equipping an aircraft, the system including:

at least one vibrational sensor for measuring vibrations in at least one direction and generating a vibrational operating signal of the rotary mechanism as a function of time, the vibrational sensor(s) being secured with a fixed casing of the aircraft and advantageously arranged near the rotary mechanism, at least one measuring member for measuring an angular position of the moving part(s), the moving part(s) including at least one degree of rotational freedom around a rotation axis.

According to the invention, such a system is remarkable in that it includes at least:

a preprocessing unit for calculating a synchronous variance of the vibrations of the vibrational signal measured by the vibrational sensor(s) over a cycle of a predetermined number n of rotations of the moving part(s) respectively around the axis (axes) of rotation, the synchronous variance corresponding to an average of the deviations squared between a vibration value measured at a predetermined moment and an average value calculated at the same predetermined moment, the calculated average value being determined for a rotation of the moving part(s) from a sum of the accelerations measured over the predetermined number n of rotations, a mapping unit for generating at least two maps $M_1$, $M_2$ respectively representative of a value of the synchronous variance as a function on the one hand of the angular position of the moving part(s) and on the other hand a predetermined range of harmonics of the vibrational signal, the at least two maps $M_1$, $M_2$ respectively corresponding to successive acquisitions of the synchronous variance at least at two moments $t_1$, $t_2$ that are separate from one another, an analysis unit for comparing the values of the synchronous variance between at least two successive maps $M_1$, $M_2$, the analysis unit making it possible to generate an indicator CI as a function of a comparison between a first map $M_1$ of the synchronous variance at a first moment $t_1$ and a second map $M_2$ of the synchronous variance at a second moment $t_2$ later than the first moment $t_1$, and an alarm unit for generating an alarm, when a current value $CI_{t1}$, $CI_{t2}$ of the indicator CI exceeds a predetermined threshold value corresponding to the damage in the moving part(s) of the rotary mechanism.

In other words, the vibrational sensor may for example be of the piezoelectric type and detect the accelerations generated during a rotational operation of the moving part(s) of a planetary reduction gearing equipping an aircraft. Such a vibrational sensor may further be secured with the fixed casing having a toothed guide ring of a planetary reduction gearing.

The measuring member to measure an angular position of the moving part(s) may in turn comprise an optical or magnetic sensor of the encoder type and having a notched disc such as a phonic wheel secured for example to a planet carrier of the planetary reduction gearing.

The preprocessing unit may also be arranged in whole or in part on the aircraft so as to limit the quantity of data acquired by the vibrational sensor and the measuring member in order to make them easier to store in an on board memory.

Once the mission of the aircraft is complete, the values of the synchronous variance measured from the vibrational sensor(s) over a cycle of a predetermined number n of rotations of the moving part(s) respectively around the axis (axes) of rotation may be sent to the mapping unit to generate the at least two maps $M_1$, $M_2$ respectively representative of the values of the synchronous variance.

Thus, according to a first variant of the invention, the mapping unit, the analysis unit and the alarm unit can be arranged in a ground station at an operator of the aircraft and/or the manufacturer of the aircraft, who may then alert the operator of the aircraft to damage affecting the moving part(s) of the rotary mechanism.

According to a second variant of the invention, the mapping unit can be on board the aircraft. In this case, the mapping unit may generate the at least two maps $M_1$, $M_2$ respectively representative of the values of the synchronous variance during the mission of the aircraft.

Once the mission of the aircraft is complete, one then sends the ground the at least two maps $M_1$, $M_2$ to the analysis unit. Thus, the analysis unit and the alarm unit can in turn be arranged in a ground station at an operator of the aircraft and/or at the manufacturer of the aircraft.

BRIEF DESCRIPTION OF THE DRAWINGS

The invention and its advantages will appear in more detail in the context of the following description with example embodiments provided as an illustration in reference to the appended figures, which show.

DETAILED DESCRIPTION OF THE INVENTION

The elements present in several separate figures are assigned a single and same reference.

As already mentioned, the invention relates to a method for monitoring and detecting the formation of damage in at least one moving part of a rotary mechanism.

Figure 1:
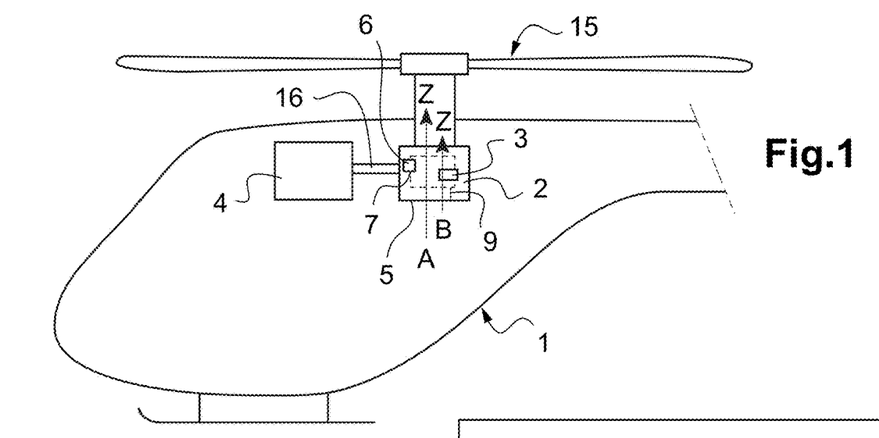
FIG. 1, a side view of an aircraft in particular including a rotary mechanism and at least one moving part intended to be monitored, according to the invention, FIG. 2, a block diagram illustrating a system for monitoring and detecting the formation of damage in at least one moving part, according to the invention, FIGS. 3 and 4, flowcharts illustrating example embodiments of the method for monitoring and detecting the formation of damage in at least one moving part of a rotary mechanism, according to the invention, FIG. 5, a flowchart providing a detailed illustration of the sub-steps of a mapping step of the monitoring and detection method, according to the invention, FIG. 6, a flowchart providing a detailed illustration of the sub-steps of an analysis step of the monitoring and detection method, according to the invention, FIG. 7, a map illustrating, at a moment $t_1$, the non-normalized values of a synchronous variance of the vibrational signal measured during the operation of the moving part(s) of the rotary mechanism, according to the invention, FIG. 8, a map illustrating, at a moment $t_1$, the normalized values of a synchronous variance of the vibrational signal measured during the operation of the moving part(s) of the rotary mechanism, according to the invention, FIG. 9, a map illustrating, at a moment $t_1$, the normalized and discretized values of a synchronous variance of the vibrational signal measured during the operation of the moving part(s) of the rotary mechanism, according to the invention, FIG. 10, a map illustrating, at a moment $t_1$, different classes of normalized and discretized values of a synchronous variance of the vibrational signal measured during the operation of the moving part(s) of the rotary mechanism, according to the invention, and FIGS. 11 and 12, diagrams illustrating two examples of superpositions respectively of two shapes representative of a same class, according to the invention.

As shown in FIG. 1, such a rotary mechanism 2 equips an aircraft 1 here shown as an example by a rotorcraft. The rotary mechanism 2, forming all or part of a kinematic transmission chain of an engine torque, can thus be arranged in a primary power transmission gearbox 5 and thus makes it possible to rotate a primary rotor 15 at a reduced rotation speed with a transmission shaft 16 rotating at a high rotation speed.

Thus, such a rotary mechanism 2 may in particular comprise a planetary reduction gearing of the primary power transmission gearbox 5 and may include at least one moving part 3 for example formed by a planet gear of the planetary reduction gearing.

As already mentioned, such a planetary reduction gearing includes a sun gear pinion, planet gears each carried by a planet carrier and a guide ring. Each planet carrier rotates around itself with respect to the guide ring around a rotation axis Az.

Each planet gear in turn rotates on the one hand around itself around a rotation axis Bz and on the other hand around the rotation axis Az of the planet carrier during the rotation of the planet carrier.

Furthermore, a vibrational sensor 6 is secured to a fixed casing 7 of the aircraft 1, for example the casing of a fixed ring of a planetary reduction gearing, and is arranged near the rotary mechanism 2.

This vibrational sensor 6 may in particular be formed by an accelerometer chosen from accelerometers of the type with piezoelectric detection, with piezoresistive detection, with strain gauge/extensometer, with capacitive detection, with conductive detection, with optical detection, with vibratory bar, with surface waves or with acoustic emission.

Such a vibrating sensor 6 then makes it possible to measure vibration image accelerations produced during the operation of the rotary mechanism 2 in at least one direction and to generate a vibrational signal representative of the vibrations experienced by the fixed casing 7 as a function of time.

A measuring member 9 of an angular position in turn makes it possible to measure, directly or indirectly, an angular position of the moving part(s) 3, each moving part 3 including at least one degree of rotational freedom around a rotation axis Az and/or Bz.

Such a measuring member 9 may in turn comprise an optical or magnetic sensor of the encoder type and having a notched disc such as a phonic wheel secured for example to a planet carrier of the planetary reduction gearing.

Figure 2:
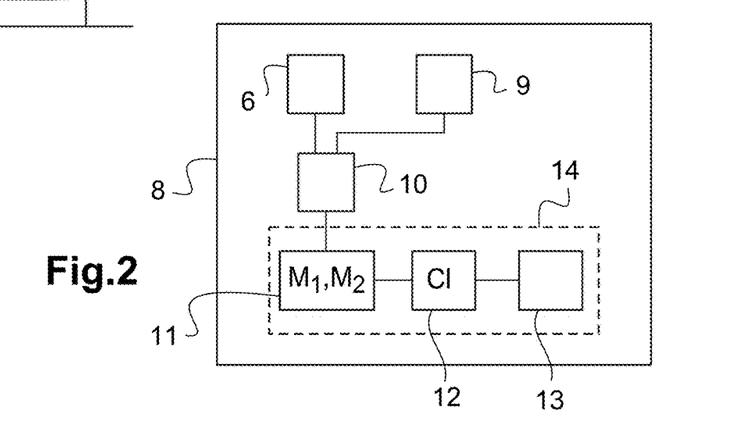

As shown in FIG. 2, the invention also relates to a system 8 for monitoring and detecting the formation of damage in the moving part(s) 3.

This system 8 includes a preprocessing unit 10 for example including at least a computer, a calculator or a processor. Such a preprocessing unit 10 is connected by a wired or wireless link to the vibrational sensor 6 and the measuring member 9. The data acquired by the vibrational sensor 6 and the measuring member 9 are then sent to the preprocessing unit 10. This preprocessing unit 10 makes it possible to calculate a value of the synchronous variance of the vibrational signal measured by the vibrational sensor 6 over a cycle of a predetermined number n of rotations of the moving part(s) 3 around its (their) respective axis (axes) of rotation Az and/or Bz.

This synchronous variance is determined from an average of the deviations squared between a current acceleration value and an average acceleration value calculated for a rotation of the moving part(s) 3 from values of the acceleration over the predetermined number n of rotations.

Furthermore, the system 8 may include a ground station 14 for example including at least a computer, a calculator or a processor. Such a ground station 14 is connected by a wireless link to the preprocessing unit 10.

Once the preprocessing of the data is done on board the aircraft 1, said data representative of the values of the synchronous variance are sent if applicable to the ground station or processed in the aircraft. The ground station 14 or the aircraft in particular includes a mapping unit 11 making it possible to generate at least two maps $M_1$, $M_2$ respectively representative of variations of the values of the synchronous variance of the vibrational signal as a function on the one hand of the angular position of the moving part(s) 3 and on the other hand of a predetermined range of harmonics corresponding to the vibrational signal. Furthermore, these at least two maps $M_1$, $M_2$ respectively correspond to successive acquisitions of the values of the synchronous variance of the accelerations at least at two moments $t_1$, $t_2$ separate from one another, for example moments corresponding to the end of two separate cycles.

Thus, the system 8 includes a mapping unit 11 for example including at least a computer, a calculator or a processor. Such a mapping unit 11 is connected by a wireless link to the preprocessing unit 10.

The maps $M_1$, $M_2$ can be illustrated in two dimensions by assigning different colors or different textures to pixels as a function of a value of the synchronous variance. Furthermore, such pixels correspond to surfaces delimited between, on the one hand, on the x-axis, two units of the angular position of the moving part(s) 3, and on the other hand, on the y-axis, two harmonic units.

Furthermore, the system 8 includes an analysis unit 12 for example including at least a computer, a calculator or a processor. Such an analysis unit 12 is connected by a wired or wireless link to the mapping unit 11.

Furthermore, the mapping unit 11 and the analysis unit 12 can be formed by a single and same computer, calculator or processor.

Such maps $M_1$, $M_2$ can then be sent to the analysis unit 12 of the ground station 14 or processed in flight so as to analyze values of the synchronous variance of the accelerations between at least two successive maps $M_1$, $M_2$. Such an analysis unit 12 can then generate an indicator CI as a function of a comparison between a first map $M_1$ of the values of the synchronous variance of the accelerations measured at a first moment $t_1$ and a second map $M_2$ of the values of the synchronous variance of the accelerations measured at a second moment $t_2$ later than the first moment $t_1$.

Lastly, once the indicator CI is generated, an alarm unit 13 of the ground station 14 can then generate an alarm if a current value $CI_{t1}$, $CI_{t2}$ of the indicator CI exceeds a predetermined threshold value corresponding to damage in the moving part(s) 3 of the rotary mechanism 2. Such an alarm unit 13 may for example comprise a speaker to emit a sound signal, a light source to emit a light and/or visual signal and/or a communication module to generate an electronic text message such as in particular an email or a "SMS" according to the acronym corresponding to the expression "Short Message Service."

Figure 3:
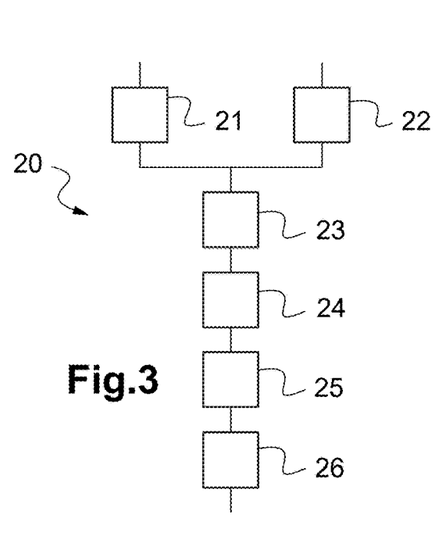

According to a first embodiment of the invention illustrated in FIG. 3, a method 20 for monitoring and detecting the formation of damage in a moving part 3 of a rotary mechanism 2 thus includes a first measuring step 21 for measuring the accelerations of a fixed casing of the aircraft 1 during the operation of the rotary mechanism 2 using the vibrational sensor 6 and a second step 22 for measuring an angular position of the moving part(s) 3.

Such first and second measuring steps 21, 22 are for example carried out simultaneously and in parallel.

The method 20 next includes a preprocessing step 23 for calculating the synchronous variance of the vibrations measured over a cycle of a predetermined number n of rotations of the moving part(s) 3 around its (their) (respective) axis (axes) of rotation, a mapping step 24 for generating the at least two maps $M_1$, $M_2$, an analysis step 25 for the variations in the synchronous variance between the at least two successive maps $M_1$, $M_2$ and an alarm step 26 for indicating the presence of damage in the moving part(s) 3. In this first embodiment of the invention, the preprocessing step 23, the mapping step 24, the analysis step 25 and the alarm step 26 can be carried out and done in flight by at least a computer, a calculator or a processor arranged on board the aircraft 1.

Figure 4:
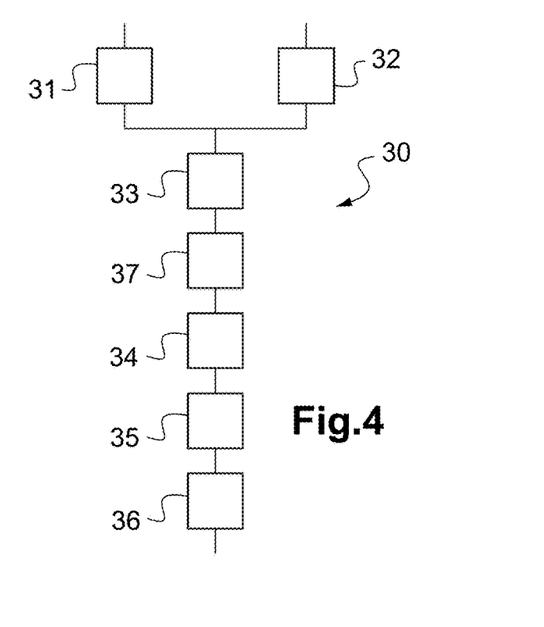

According to a second embodiment of the invention as shown in FIG. 4, a method 30 for monitoring and detecting the formation of damage in a moving part 3 of a rotary mechanism 2 may also include a first measuring step 31 for measuring the operating vibrations of the rotary mechanism 2 using the vibrational sensor 6 and a second measuring step 32 for measuring an angular position of the moving part(s) 3.

Like before, the method 30 next includes a preprocessing step 33 carried out in flight during a mission of the aircraft 1 for calculating the synchronous variance of the accelerations during the operation of the moving part(s) 3, a data transmission step 37 for transmitting data representative of the synchronous variance of the accelerations to the ground station 14.

Lastly like before, the method 30 then includes a mapping step 34 for generating at least two maps $M_1$, $M_2$, an analysis step 35 of the variations of the synchronous variance of the accelerations between the at least two successive maps $M_1$, $M_2$, and an alarm step 36 for indicating the presence of damage in the moving part(s) 3. Such mapping 34, analysis 35 and alarm 36 steps are then carried out in the ground station 14 at the operator and/or the manufacturer of the aircraft 1.

Figure 7:
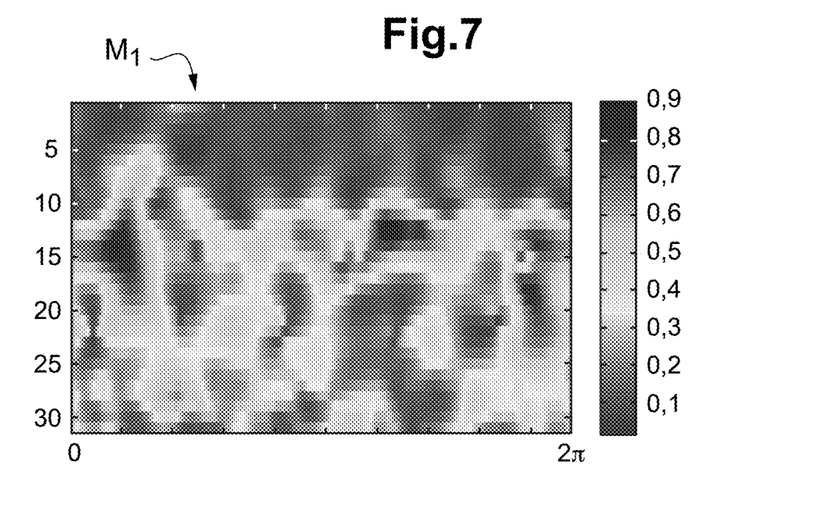

Irrespective of the embodiment, such a map $M_1$ is then as shown in FIG. 7. Each map in fact illustrates the different values of the synchronous variance of the accelerations in a two-dimensional diagram. This diagram thus shows surfaces in pixel form having different colors or textures with, on the one hand, on the x-axis the angular position of the moving part(s) 3 and, on the other hand, on the y-axis a range of predetermined harmonics corresponding to the vibrational signal. The color or texture of each pixel also depends on a value of the synchronous variance corresponding to the range of considered values on the x-axis and the y-axis. In addition, as shown, a graduated scale associates each value of the synchronous variance with a color or texture code.

Figure 5:
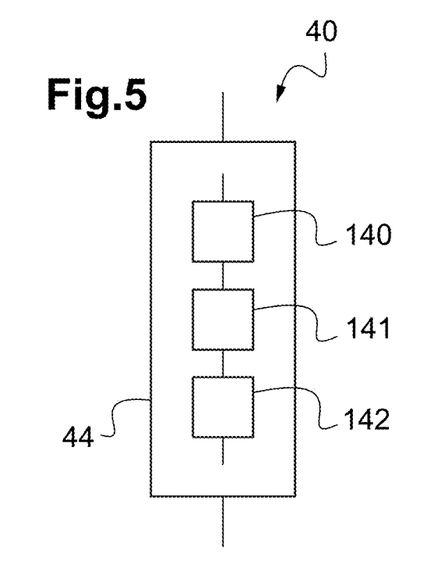

As shown in FIG. 5, a mapping step 44 of the method 40 may include, for each of the maps $M_1$, $M_2$, a normalization sub-step 140 making it possible to normalize the values of the synchronous variance of the accelerations. Such a normalization sub-step 140 then makes it possible to assign a value equal to 0 to a minimum of the synchronous variance and a value equal to 1 to a maximum of the synchronous variance.

Figure 8:
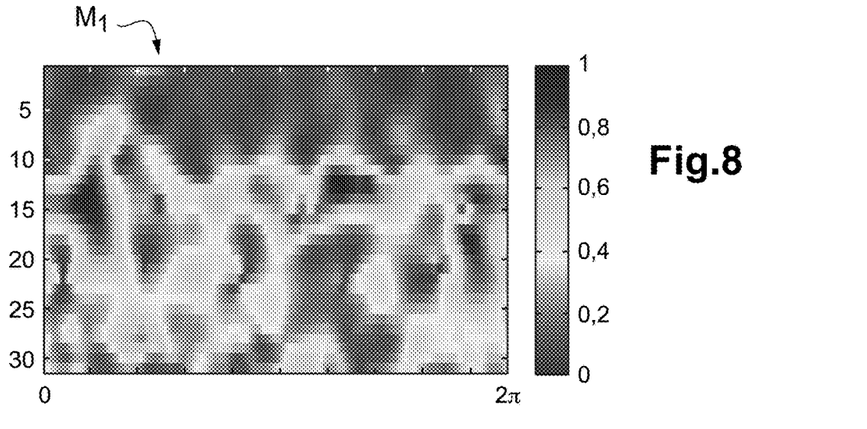

The result obtained after such a normalization sub-step 140 of the map $M_1$ is then as shown in FIG. 8, in which several pixels of different colors are shown as a function of a value of the synchronous variance corresponding to the range of values considered on the x-axis and the y-axis.

The mapping step 44 of the method 40 may also include, for each of the maps $M_1$, $M_2$, a discretization sub-step 141 making it possible to assign a value equal to 0 to each pixel initially representative of a value of the synchronous variance less than a predetermined threshold value h and to assign a value equal to 1 to each pixel initially representative of a value of the synchronous variance greater than or equal to the predetermined threshold value h. For example, such a threshold value h may be chosen arbitrarily equal to 0.5.

Figure 9:
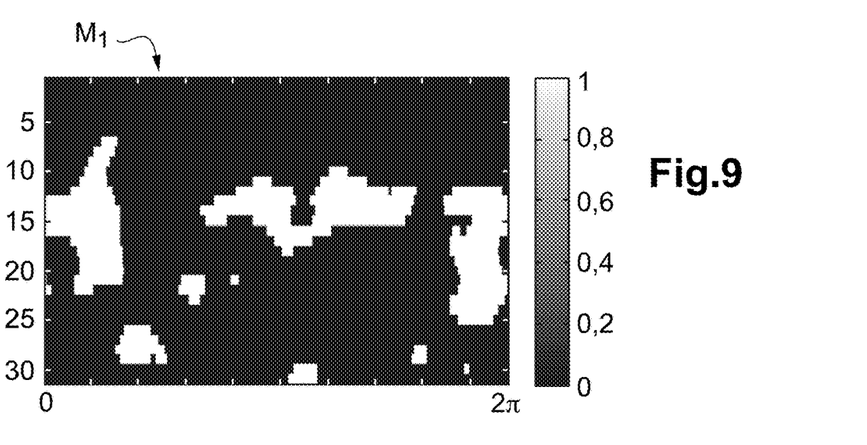

The result obtained after such a discretization sub-step 141 of the map $M_1$ is then as shown in FIG. 9, in which white pixels are then visible respectively assigned a value equal to 1 and a black background corresponding to the pixels respectively assigned a value equal 0.

Lastly, the mapping step 44 of the method 40 may also include a classification sub-step 142 to classify, in at least two classes C1-C8, at least two shapes made up of juxtaposed white pixels belonging to the map $M_1$. Such pixels are then arranged adjacent to one another and are respectively assigned a value equal to 1.

Figure 10:
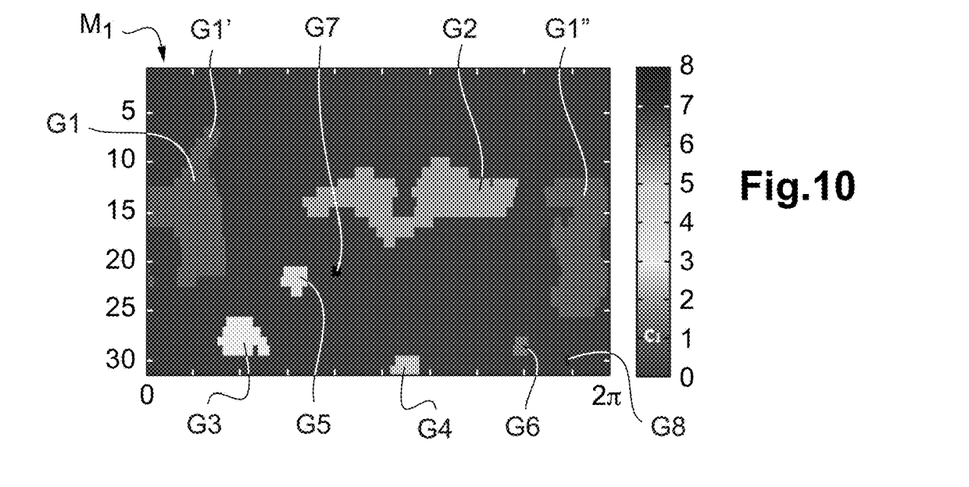

Furthermore, as shown in FIG. 10, this classification sub-step 142 for example makes it possible to identify eight groups of pixels G1-G8 assigned a value equal to 1 and to classify them into at least two groups G1, G2 by decreasing order depending on a number of juxtaposed pixels assigned a value equal to 1 respectively making them up, a first class C1 corresponding to a first group G1, a second class C2 corresponding to a second group G2 having a number of juxtaposed pixels assigned a value equal to 1 lower than the number of juxtaposed pixels assigned a value equal to 1 of the first group G1.

Furthermore, such a classification sub-step 142 makes it possible to group together, in a same group of pixels assigned a value equal to 1 forming a first subgroup G1' of pixels including at least one pixel assigned a value equal to 1 touching, on the x-axis, the origin of the map $M_1$ and corresponding to an angular position of the moving part(s) 3 equal to 0 radians and pixels assigned a value equal to 1 forming a second subgroup G1" of pixels including at least one pixel assigned a value equal to 1 touching, on the x-axis, the value $2\pi$ radians of the map $M_1$ and corresponding to an angular position of the moving part(s) 3 equal to $2\pi$ radians, the pixel(s) of the first subgroup G1' having, on the x-axis corresponding to the angular position of the moving part(s) equal to 0 radians, a harmonic value equal to that of the pixel(s) of the second subgroup G1" in the angular position of the moving part(s) 3 equal to $2\pi$ radians.

According to the example shown in this FIG. 10, the map $M_1$ may include eight groups of juxtaposed pixels assigned a value equal to 1.

Figure 6:
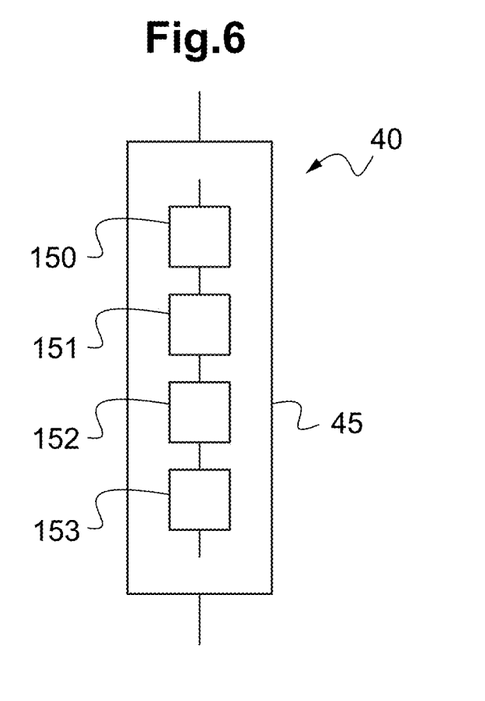

As shown in FIG. 6, an analysis step 45 of a method 40 may include a first calculating sub-step 150 consisting of superimposing the two maps, then determining, in a superposition of the first map $M_1$ with the second map $M_2$, respectively for each class C1-C8, an intersection surface S3 between a first form F1 corresponding to the class C1 of the first map $M_1$ and a second form F2 corresponding to the same class C1 of the second map $M_2$.

Figure 11:
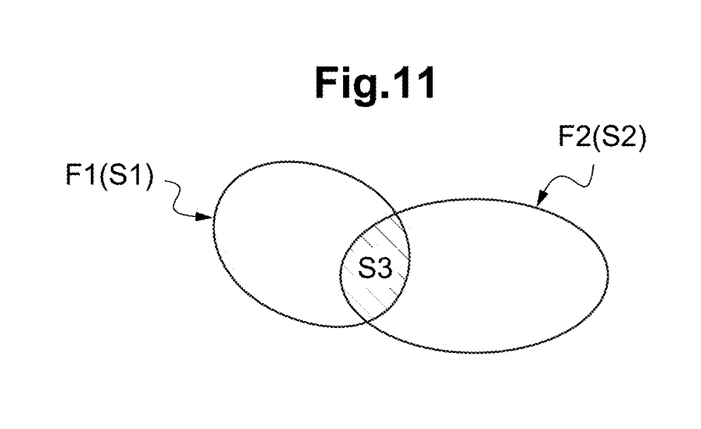
Figure 12:
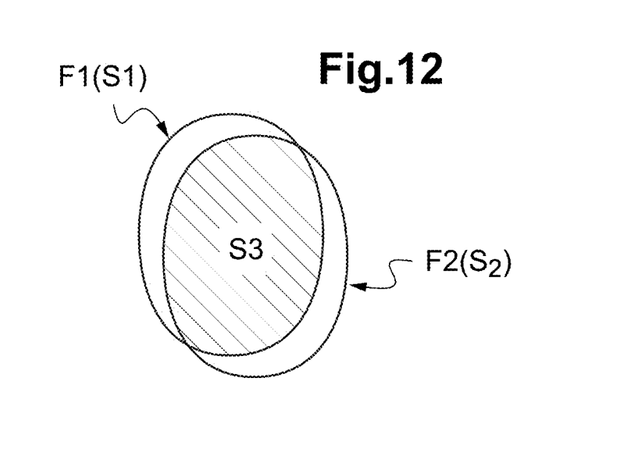

Such an intersection surface S3 can then vary over time and be as shown in FIGS. 11 and 12 corresponding to two distinct superpositions of a same class C1 between a first map $M_1$ and a second map $M_2$ on the one hand and a third map $M_3$ and a fourth map $M_4$ on the other hand.

The analysis step 45 of the method 40 may next include a second calculating sub-step 151 consisting of calculating, in the superposition of the first map $M_1$ with the second map $M_2$, respectively for each class C1-C8, an exclusion surface S4 between a first form F1 corresponding to the considered class C1-C8 of the first map $M_1$ and a second form F2 corresponding to the same considered class C1-C8 of the second map $M_2$. Such an exclusion surface S4 is thus equal to the sum between a first surface S1 of the first form F1 and a second surface S2 of the second form F2 from which the intersection surface S3 is deducted.

The analysis step 45 of the method 40 can also include a third calculating sub-step 152 consisting of calculating a score P equal to the difference between the intersection surface S3 and the exclusion surface S4 previously calculated in the calculating sub-steps 150 and 151. The score P is then negative according to the example illustrated in FIG. 11 and positive according to the example illustrated in FIG. 12.

Lastly, the analysis step 45 of the method 40 may include a fourth calculating sub-step 153 consisting of respectively calculating, for each class C1, C2, current values $CI_{t1}$, $CI_{t2}$ of the indicator CI per iteration, a second current value $CI_{t2}$ of the indicator CI corresponding to the second map $M_2$ being equal to a maximum between the value 0 and the sum between, on the one hand, a first current value $CI_{t1}$ of the indicator CI corresponding to the first map $M_1$ and on the other hand a product between the score P and the time elapsed dt between the moments $t_2$ and $t_1$, according to the equation:

$$CI_{t2} = \max([0, CI_{t1} + P \cdot dt])$$

with $dt = t_2 - t_1$.

Furthermore, the indicator CI may advantageously be chosen equal to 0 at an initial moment to corresponding to the beginning of the acquisition of the vibrational signal.

As a function of the current values $CI_{t1}$, $CI_{t2}$ of the indicator CI, it is then possible to generate an alarm when said current value $CI_{t1}$, $CI_{t2}$ of the indicator CI exceeds a predetermined threshold value corresponding to damage in the moving part(s) 3 of the rotary mechanism 2.

Furthermore, such a method may require a minimal number of measurements of the accelerations per hour of flight in order to guarantee a detection performance of the damage in the moving part(s) 3. Such a method may also require a stability of the flight parameters of the aircraft and for example be done at a constant rotation speed of the primary rotor and/or a constant driving motor torque of the primary rotor.

Naturally, the present invention is subject to many variations regarding its implementation. Although several embodiments have been described, it is understood that it is not conceivable to exhaustively identify all possible embodiments. It is of course possible to consider replacing one described means by an equivalent means without going beyond the scope of the present invention.

The invention claimed is:

1. A method for monitoring and detecting formation of damage in at least one moving part of a rotary mechanism forming all or part of a kinematic transmission chain of a motor torque, the rotary mechanism equipping an aircraft, the method including:
   at least a first measuring step including measuring vibrations in at least one direction and generating a vibrational signal for operation of the rotary mechanism as a function of time, the first measuring step being carried out using at least one vibrational sensor secured to a fixed casing of the aircraft,
   at least one second measuring step including a measurement of the angular position of the at least one moving part, the moving part(s) including at least one degree of rotational freedom around a rotation axis,
   wherein the method includes at least:
   a preprocessing step for calculating a synchronous variance of the vibrations of the vibrational signal measured by the at least one vibrational sensor over a cycle of a predetermined number n of rotations of the at least one moving part respectively around the rotation axis, the synchronous variance being determined from an average of the deviations squared between an acceleration value measured at a predetermined moment and an average value calculated at the same predetermined moment,
   a mapping step for generating at least two maps $M_1$, $M_2$ representative respectively of a value of the synchronous variance as a function on the one hand of the angular position of the at least one moving part and on the other hand of a range of predetermined harmonics of the vibrational signal, the at least two maps $M_1$, $M_2$ respectively corresponding to successive acquisitions of the synchronous variance at least at two moments $t_1$, $t_2$ separate from one another;
   an analysis step for comparing the values of the synchronous variance between at least two successive maps $M_1$, $M_2$, the analysis step enabling the generation of an indicator CI as a function of a comparison between a first map $M_1$ of the synchronous variance at a first moment $t_1$ and a second map $M_2$ of the synchronous variance at a second moment $t_2$ later than the first moment $t_1$, and
   an alarm step for generating an alarm when a current value $CI_{t1}$, $CI_{t2}$ of the indicator CI exceeds a predetermined threshold value corresponding to the damage in the at least one moving part of the rotary mechanism.

2. The method according to claim 1,
   wherein the preprocessing step is done on board the aircraft, the method including a data transmission step allowing a transmission of the data representative of the synchronous variance to at least one ground station, the mapping, analysis and alarm steps in turn being done on the ground in whole or in part with the ground station.

3. The method according to claim 1,
   wherein the mapping step includes, for each of the maps $M_1$, $M_2$, a sub-step for normalization of the values of the synchronous variance, the normalization sub-step enabling assignment of a value equal to 0 to pixels representative of a minimum of the synchronous variance and a value equal to 1 to pixels representative of a maximum of the synchronous variance, the normalization sub-step making it possible to assign a value of between 0 and 1 to all of the other pixels representative of a value between the minimum and the maximum of the synchronous variance.

4. The method according to claim 3,
   wherein the mapping step includes, for each of the maps $M_1$, $M_2$, a discretization sub-step enabling assignment of a value equal to 0 to each pixel initially representative of a value of the synchronous variance below a predetermined threshold value h and to assign a value equal 1 to each pixel initially representative of a value of the synchronous variance greater than or equal to a predetermined threshold value h.

5. The method according to claim 4,
   wherein the mapping step includes a classification sub-step for classifying, in at least two classes C1, C2, at least two forms made up of juxtaposed pixels belonging to the plurality of maps $M_1$, $M_2$, the pixels each respectively being assigned a value equal to 1, the classification sub-step enabling identification of at least two groups of pixels G1, G2 and classify the at least two groups G1, G2 according to a decreasing order depending on a number of juxtaposed pixels assigned a value equal to 1 respectively making them up, a first class C1 corresponding to a first group G1 and a second class C2 corresponding to a second group G2 having a number of juxtaposed pixels assigned a value equal to 1 less than the number of juxtaposed pixels assigned a value equal to 1 of the first group G1.

6. The method according to claim 5, wherein, for each of the maps $M_1$, $M_2$, the classification sub-step contains, in a same group, pixels assigned a value equal to 1 forming a first subgroup G1' of pixels including at least one pixel assigned a value equal to 1 touching, on the x-axis, the origin of the map $M_1$, $M_2$ and corresponding to an angular position of the at least one moving part greater than 0 radian and pixels assigned a value equal to 1 forming a second subgroup of pixels G1" including at least one pixel assigned a value equal to 1 touching, on the x-axis, a value of $2\pi$ radians of the map $M_1$, $M_2$ and corresponding to an angular position of the at least one moving part of less than $2\pi$ radians, the at least one pixel of the first subgroup G1' having, on the x-axis corresponding to the angular position of the at least one moving part equal to 0 radians, a harmonic value equal to that of the at least one pixel of the second subgroup G1" in the angular position of the at least one moving part equal to $2\pi$ radians.

7. The method according to claim 1, wherein the analysis step includes a first calculating sub-step consisting of calculating, superimposing the first map $M_1$ with the second map $M_2$, respectively for each class C1, C2, an intersection surface S3 between a first form F1 corresponding to the class C1, C2 of the first map $M_1$ and a second form F2 corresponding to the class C1, C2 of the second map $M_2$.

8. The method according to claim 7, wherein the analysis step includes a second calculating sub-step consisting of calculating, in the superposition of the first map $M_1$ with the second map $M_2$, respectively for each class C1, C2, an exclusion surface S4 between the first form F1 corresponding to the class C1, C2 of the first map $M_1$ and a second form F2 corresponding to the class C1, C2 of the second map $M_2$, the exclusion surface S4 being equal to the sum between a first surface S1 of the first form F1 and a second surface S2 of the second form F2 from which the intersection surface S3 is deducted.

9. The method according to claim 8, wherein the analysis step includes a third calculating sub-step consisting of calculating a score P equal to the difference between the intersection surface S3 and the exclusion surface S4.

10. The method according to claim 9, wherein the analysis step includes a fourth calculating sub-step consisting of respectively calculating, for each class C1, C2, current values $CI_{t1}$, $CI_{t2}$ of the indicator CI per iteration, a second current value $CI_{t2}$ of the indicator CI corresponding to the second map $M_2$ being equal to a maximum between the value 0 and the sum between, on the one hand, a first current value $CI_{t1}$ of the indicator CI corresponding to the first map $M_1$ and on the other hand, a product between the score P and the time elapsed dt between the moments $t_2$ and $t_1$, according to the equation:

$$CI_{t2} = \max([0, CI_{t1} + P \cdot dt])$$

with $dt = t_2 - t_1$.

11. The method according to claim 8, wherein the analysis step includes a third calculating sub-step comprising calculating a score P equal to the difference between the intersection surface S3 and the exclusion surface S4.

12. The method according to claim 11, wherein the analysis step includes a fourth calculating sub-step comprising respectively calculating, for each class C1, C2, current values $CI_{t1}$, $CI_{t2}$ of the indicator CI per iteration, a second current value $CI_{t2}$ of the indicator CI corresponding to the second map $M_2$ being equal to a maximum between the value 0 and the sum between, on the one hand, a first current value $CI_{t1}$ of the indicator CI corresponding to the first map $M_1$ and on the other hand, a product between the score P and the time elapsed dt between the moments $t_2$ and $t_1$, according to the equation:

$$CI_{t2} = \max([0, CI_{t1} + P \cdot dt])$$

with $dt = t_2 - t_1$.

13. A system for monitoring and detecting formation of damage in at least one moving part of a rotary mechanism forming all or part of a kinematic transmission chain for an engine torque, the rotary mechanism equipping an aircraft, the system including:
   at least one vibrational sensor for measuring vibrations in at least one direction and generating a vibrational operating signal of the rotary mechanism as a function of time, the at least one vibrational sensor being secured with a fixed casing of the aircraft,
   at least one measuring member for measuring an angular position of the at least one moving part, the at least one the moving part including at least one degree of rotational freedom around a rotation axis,
   wherein the system includes at least: a preprocessing unit for calculating a synchronous variance of the vibrations of the vibrational signal measured by the at least one vibrational sensor over a cycle of a predetermined number n of rotations of the at least one moving part respectively around the axis of rotation, the synchronous variance corresponding to an average of a deviation squared between an acceleration value measured at a predetermined moment and an average value calculated at the predetermined moment,
   a mapping unit for generating at least two maps $M_1$, $M_2$ respectively representative of a value of the synchronous variance as a function on the one hand of the angular position of the at least one moving part and on the other hand a predetermined range of harmonics of the vibrational signal, the at least two maps $M_1$, $M_2$ respectively corresponding to successive acquisitions of the synchronous variance at least at two moments $t_1$, $t_2$ that are separate from one another,
   an analysis unit for comparing the values of the synchronous variance between at least two successive maps $M_1$, $M_2$, the analysis unit generate enabling the generation of an indicator CI as a function of a comparison between a first map $M_1$ of the synchronous variance at a first moment $t_1$ and a second map $M_2$ of the variance at a second moment $t_2$ later than the first moment $t_1$, and an alarm unit for generating an alarm, when a current value $CI_{t1}$, $CI_{t2}$ of the indicator CI exceeds a predetermined threshold value corresponding to the damage in the at least one moving part of the rotary mechanism.

14. The system according to claim 13, wherein the pre-processing unit is on board the aircraft.

15. A method for monitoring and detecting formation of damage in a moving part of a rotary mechanism of a kinematic transmission chain of a motor torque of an aircraft, the method including:
a first measuring step including measuring vibrations in a direction and generating a vibrational signal for operation of the rotary mechanism as a function of time, the first measuring step being carried out using a vibrational sensor secured to a fixed casing of the aircraft,
a second measuring step including measuring the angular position of the moving part, the moving part including at least one degree of rotational freedom around a rotation axis,
wherein the method includes:
a preprocessing step for calculating a synchronous variance of the vibrations of the vibrational signal measured by the vibrational sensor over a cycle of a predetermined number n of rotations of the moving part respectively around the rotation axis, the synchronous variance being determined from an average of the deviations squared between an acceleration value measured at a predetermined moment and an average value calculated at the same predetermined moment,
a mapping step for generating two maps $M_1$, $M_2$ representative respectively of a value of the synchronous variance as a function of the angular position of the moving part and of a range of predetermined harmonics of the vibrational signal, the two maps $M_1$, $M_2$ respectively corresponding to successive acquisitions of the synchronous variance at least at two moments $t_1$, $t_2$ separate from one another;
an analysis step for comparing the values of the synchronous variance between at least two successive maps $M_1$, $M_2$, the analysis step enabling the generation of an indicator CI as a function of a comparison between a first map $M_1$ of the synchronous variance at a first moment $t_1$ and a second map $M_2$ of the synchronous variance at a second moment $t_2$ later than the first moment $t_1$, and
an alarm step for generating an alarm when a current value $CI_{t1}$, $CI_{t2}$ of the indicator CI exceeds a predetermined threshold value corresponding to the damage in the moving part of the rotary mechanism.

16. The method according to claim 15,
wherein the preprocessing step is done on board the aircraft, the method including a data transmission step allowing a transmission of the data representative of the synchronous variance to at least one ground station, the mapping, analysis and alarm steps in turn being done on the ground in whole or in part with the ground station.

17. The method according to claim 15,
wherein the mapping step includes, for each of the maps $M_1$, $M_2$, a sub-step for normalization of the values of the synchronous variance, the normalization sub-step enabling assignment of a value equal to 0 to pixels representative of a minimum of the synchronous variance and a value equal to 1 to pixels representative of a maximum of the synchronous variance, the normalization sub-step making it possible to assign a value of between 0 and 1 to all of the other pixels representative of a value between the minimum and the maximum of the synchronous variance.

18. The method according to claim 17,
wherein the mapping step includes, for each of the maps $M_1$, $M_2$, a discretization sub-step enabling assignment of a value equal to 0 to each pixel initially representative of a value of the synchronous variance below a predetermined threshold value h and to assign a value equal 1 to each pixel initially representative of a value of the synchronous variance greater than or equal to a predetermined threshold value h,
wherein the mapping step includes a classification sub-step for classifying, in at least two classes C1, C2, at least two forms made up of juxtaposed pixels belonging to the plurality of maps $M_1$, $M_2$, the pixels each respectively being assigned a value equal to 1, the classification sub-step enabling identification of at least two groups of pixels G1, G2 and classify the at least two groups G1, G2 according to a decreasing order depending on a number of juxtaposed pixels assigned a value equal to 1 respectively making them up, a first class C1 corresponding to a first group G1 and a second class C2 corresponding to a second group G2 having a number of juxtaposed pixels assigned a value equal to 1 less than the number of juxtaposed pixels assigned a value equal to 1 of the first group G1, and
wherein, for each of the maps $M_1$, $M_2$, the classification sub-step contains, in a same group, pixels assigned a value equal to 1 forming a first subgroup G1' of pixels including at least one pixel assigned a value equal to 1 touching, on the x-axis, the origin of the map $M_1$, $M_2$ and corresponding to an angular position of the at least one moving part greater than 0 radian and pixels assigned a value equal to 1 forming a second subgroup of pixels G1'' including at least one pixel assigned a value equal to 1 touching, on the x-axis, a value of $2\pi$ radians of the map $M_1$, $M_2$ and corresponding to an angular position of the at least one moving part of less than $2\pi$ radians, the at least one pixel of the first subgroup G1' having, on the x-axis corresponding to the angular position of the at least one moving part equal to 0 radians, a harmonic value equal to that of the at least one pixel of the second subgroup G1'' in the angular position of the at least one moving part equal to $2\pi$ radians.

19. The method according to claim 15,
wherein the analysis step includes a first calculating sub-step comprising calculating, superimposing the first map $M_1$ with the second map $M_2$, respectively for each class C1, C2, an intersection surface S3 between a first form F1 corresponding to the class C1, C2 of the first map $M_1$ and a second form F2 corresponding to the class C1, C2 of the second map $M_2$.

20. The method according to claim 19,
wherein the analysis step includes a second calculating sub-step comprising calculating, in the superposition of the first map $M_1$ with the second map $M_2$, respectively for each class C1, C2, an exclusion surface S4 between the first form F1 corresponding to the class C1, C2 of the first map $M_1$ and a second form F2 corresponding to the class C1, C2 of the second map $M_2$, the exclusion surface S4 being equal to the sum between a first surface S1 of the first form F1 and a second surface S2 of the second form F2 from which the intersection surface S3 is deducted.

* * * * *